March 21, 1972    A. W. GOLDSTEIN ET AL    3,651,217
ANTIBIOTIC EFFECTIVE AGAINST GRAM-POSITIVE
BACTERIA AND METHOD OF PREPARATION
Filed Jan. 9, 1968
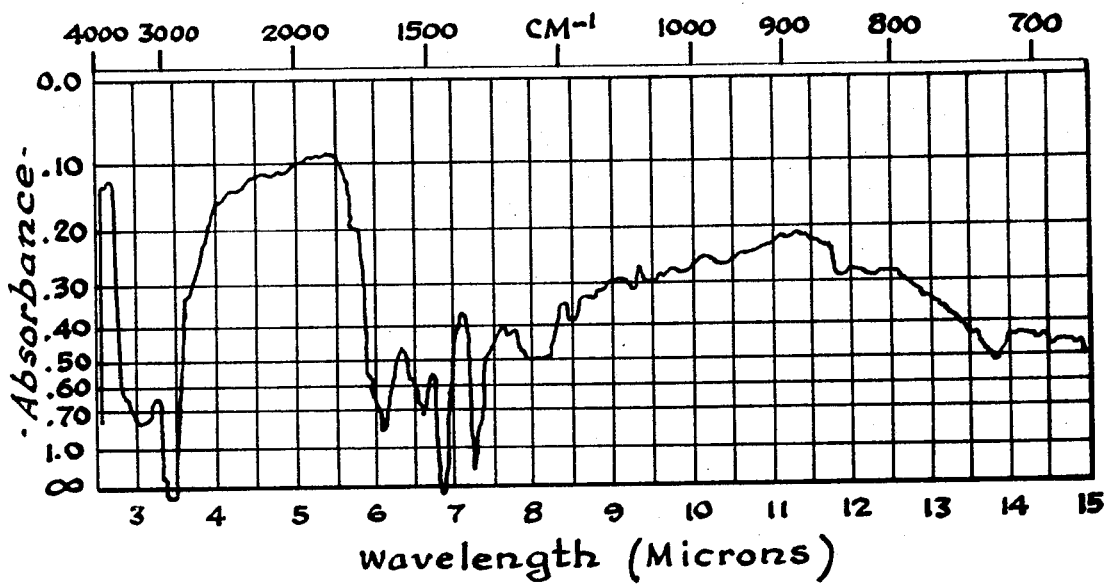
Inventors
Alma W. Goldstein
Joseph F. Prokop
By Gildo E. Fato
Attorney

United States Patent Office 3,651,217
Patented Mar. 21, 1972

3,651,217
ANTIBIOTIC EFFECTIVE AGAINST GRAM-POSITIVE BACTERIA AND METHOD OF PREPARATION
Alma W. Goldstein, Lake Bluff, and Joseph F. Prokop, Libertyville, Ill., assignors to Abbott Laboratories, North Chicago, Ill.
Continuation-in-part of application Ser. No. 339,589, Jan. 23, 1964. This application Jan. 9, 1968, Ser. No. 696,548
Int. Cl. A61k 21/00
U.S. Cl. 424—116     8 Claims

ABSTRACT OF THE DISCLOSURE

An antibacterial agent effective against gram positive bacteria made by the cultivation of various strains of the microorganism Streptomyces impexus.

This application is a continuation-in-part of U.S. application Ser. No. 339,589, filed Jan. 23, 1964, now abandoned.

This invention relates to a new antibiotic designated as M–411 and to a process for its production.

The principal object of the invention is to provide a new composition of matter which is useful in suppressing the growth of a variety of microorganisms including pathogenic bacteria. Another object is to provide a process for the preparation and purification of M–411.

We have discovered that a previously undescribed microorganism, Streptomyces impexus, when cultivated under controlled conditions in an aqueous broth containing suitable sources of carbon and nitrogen produces a novel antibiotic herein identified as M–411. Two strains of Streptomyces impexus, isolated from different soil samples, have been deposited at the Culture Collection Unit of the Northern Utilization Research and Development Division, U.S. Department of Agriculture, Peoria, Ill., under the code numbers NRRL 3089 and NRL 3090. The taxonomy of the new species follows.

Taxonomy of Streptomyces impexus, n. sp., strains NRRL 3089 and 3090

Streptomyces impexus is represented by two strains identified as NRRL 3089 and 3090. Strain NRRL 3089 was isolated from a soil sample collected in Youngstown, Ohio, U.S.A. Strain NRRL 3090 was isolated from a Brazilian soil. Isolation of both strains was carried out by a standard dilution procedure employing a medium which is selective chiefly of actinomycetes. The two strains are indistinguishable by any significant morphological, cultural, or biochemical characteristics commonly employed in the determination of the taxonomic position of representatives of the genus Streptomyces. Both strains produce the same antibiotic.

The cultural, morphological, and biochemical characteristics outline below for Streptomyces impexus were compared with published descriptions of other species listed in Bergey's Manual of Determinative Bacteriology, Seventh Edition, 1957, Williams and Wilkins Company, Baltimore, Md.; The Actinomycetes, Volume 2, Classification, Identification and Descriptions of Genera and Species, Waksman, S. A., 1961, The Williams and Wilkins Company; Guide to the Identification of Bacteria and Actinomycetes, Section pertaining to Actinomcetes, edited by Routien, J. B., Chas. Pfizer and Company, Inc., 1957, from Krassilonikov, N. A., Academy of Sciences. Moscow, U.S.S.R., 1949; Problems in the Classification of Antagonistic Actinomycetes, translation by Danga, F., edited by Gottlieb. D., 1959, American Institute of Biological Sciences, Washington, D.C., from Gauze, D. F., et al., Moscow, U.S.S.R. In addition, the original source literature was examined for many of the species listed under Section Spira, Series Olives Buff and Series Gray in A Guide to the Classification of Streptomycetes According to Selected Groups, Pridham, T. G., Hesseltine, C. W., and Benedict, R. G., Applied Microbiology, Vol. 6, No. 1, pp. 52–79, January 1958.

The Streptomycete represented by strains NRRL 3089 and 3090 was considered significantly different from hitherto described species and was given the name Streptomyces impexus, n. sp. The specific epithet is Latin meaning "unkempt or uncombed" referring to the characteristic disordered array of terminally clustered sorophores which, through predominantly open spirals, may also contain in loose terminal coils of few turns.

The following cultural, biochemical or physiological, and morphological characteristics indicate the distinctive nature of the organism.

With the exception of determining the cultural characteristics and proteolytic activity in gelatin which was done at 24° C., all cultural characteristics in the standard media listed below were obtained by incubation at 28° C. Unless otherwise noted, agar media were dispensed in volumes of 20.0 ml. in 100 mm. pressed bottom glass Petri plates. The agar surface was inoculated with a spore suspension in such manner as to provide a band of confluent growth approximately 1.0 cm. wide toward one side of the plate with more or less isolated colonies over the remainder of the agar surface. Where colony diameters are given, such colonies were usually about 1.0 cm. removed from the nearest growth.

The color code references are from the Color Harmony Manual, third edition, Jacobsen, R., Granville, W. C., and Foss, C. E., 1948, Container Corporation of America. Corresponding color numbers and names are from the ISCC-NBS Method of Designating Colors and a Dictionary of Color Names, U.S. Department of Commerce, National Bureau of Standards Circular 553, 1955. The mat surface of color chips was used for all color determinations.

(I) CULTURAL CHARACTERISTICS AND MACROMORPHOLOGY

Czapek's solution agar with dextrose, 14 days, 28° C.

NRRL 3089.—Isolated colonies 4.0 mm. convex extending 0.5–1.0 mm. into agar. Sporulation good over all growth. No diffusible pigment. Aerial (spore color) 3fe, 63 light brownish gray. Reverse 2nc, 84, strong yellow with centers of some isolated colonies 3nc, 71, moderate orange yellow.

NRRL 3090.—Same as NRRL 3089 except reverse at edge of confluent growth and centers of isolated colonies 2nc, 84, strong yellow and center of confluent growth 2ga, 86, light yellow.

Calcium malate agar

NRRL 3089—14 days.—Abundant growth and sporulation. Flat isolated colonies 4.5–6.0 mm. with 1.0 mm. filamentous growth extending over surface. 1.0 mm. digestion of malate near crowded growth only. No diffusible pigment. Aerial (sport color) 3ig, 80, grayish yellowish brown.

NRRL 3090—14 days.—Same with aerial at edge of confluent growth and on isolated colonies 3ig, 80, grayish yellowish brown, aerial at center of confluent growth 3fe, 63, light brownish gray.

NRRL 3089 and 3090—21 days.—Digestion of malate to 4.0 mm. Aerial 3ig, 80, grayish yellowish brown. Reverse 2gc, 90, grayish yellow. No diffusible pigment.

Glycerol asparagine agar—14 days

NRRL 3089 and 3090.—Abundant growth, moderate to good sporulation, faint yellowish diffusible pigment. Aerial (spores) 3fe, 63, light brownish gray. Reverse 2nc, 84, strong yellow.

Glycerol arginine agar

NRRL 3089—14 days.—Good growth, moderate sporulation. Isolated colonies 2.5 mm. plus 1.5 mm. heavy filamentous surface extension and slight extension into agar. No diffusible pigment. Aerial 3dc, 93, yellowish gray. Reverse 31c, 71, moderate orange yellow.

NRRL 3090—14 days.—Same as NRRL 3089 except sporulation more abundant. Aerial 3ge, 79, light grayish yellowish brown. Reverse, center of confluent growth and isolated colonies 31c, 71, moderate orange yellow, at edges 2gc, 90, grayish yellow.

NRRL 3089—21 days.—Abundant growth and sporulation. Isolated colonies 6.0 mm. with 2.5 mm. central convex portion, edges heavy filamentous, irregular. No diffusible pigment. Aerial (spores) 3fe, 63, light brownish gray. Reverse center of confluent growth and isolated colonies 3ie, 76, light yellowish brown. Reverse at edge of confluent growth and filamentous portion of isolated colonies 2hb, 87, moderate yellow.

NRRL 3090—21 days.—Same as NRRL 3089 except reverse color center of confluent growth 3pe, 72, dark orange yellow, edge of confluent growth and edge of isolated colonies 2fb, 89, pale yellow.

Inorganic salts soluble starch agar

NRRL 3089 and 3090—14 days.—Good growth and sporulation. Isolated colonies 3.0 mm. with 0.5 mm. extending into agar. No diffusible pigment. Sporulating aerial 3fe, 63, light brownish gray. Reverse center of confluent growth 2gc, 90, grayish yellow; edge of confluent growth and under isolated colonies 2ic, 87, moderate yellow.

Hydrolysis, not recorded at 14 days, was 9.0 mm. at seven days and 15–20 mm. at 21 days measured from edge of confluent growth by iodine test.

Nutrient agar—14 days

NRRL 3089 and 3090.—Good growth, sparse white aerial on some colonies (no spores microscopically by 21 days). Isolated colonies 4.0 mm. flat to slightly umbonate, slightly erose edge. No soluble pigment. Dull surface of non-aerial growth 1½gc, 105, grayish greenish yellow, reverse 1½hb light yellow.

Glucose agar

NRRL 3089 and 3090—14 days.—Moderate growth, no aerial, no diffusible pigment. Isolated colonies low convex 2–4 mm. with slight sheen to surface. Surface and reverse 1fb, 104, pale greenish yellow.

Blood agar

NRRL 3089 and 3090—14 days.—Abundant growth and leathery appearance. Colonies with central papillae and few radical indentations. Sparse aerial in center of crowded growth area. Hemolysis 9.0 mm. Aerial non-sporulating 1ca, 121, pale yellow green.

NRRL 3089 and 3090—21 days.—Surface of non-aerial growth 24½li, 127, grayish olive green, aerial 1½db, 89, pale yellow. Hemolysis 12.0 mm.

Oatmeal tomato paste agar, pH adjusted to 7.0

NRRL 3089 to 3090—2 days.—Good growth, isolated colonies, 0.5 mm. with scant aerial.

NRRL 3089 and 3090—6 days.—Abundant growth and sporulation, much visible exudate. Aerial (spores plus exudate) 5fe, 63, light brownish gray.

NRRL 3089 and 3090—14 days.—Isolated colonies 4–5 mm. convex with 1.0–2.0 mm. extending into agar, edges slightly erose. Surface of growth pitted from remains of exudate. Darker aerial 3ih, 265, medium gray, lighter aerial (minority colony type) 5fe, 63, light brownish gray.

Pridham and Gottlieb basal carbohydrate utilization medium

Both NRRL 3089 and 3090 grew slower in the medium containing copper sulfate than in duplicate sets in which copper sulfate was omitted from the medium. No growth beyond that of the control (no added carbon source) occurred in the presence of copper sulfate with sodium acetate as the carbon source. Good growth occurred with sodium acetate in the absence of added copper sulfate.

Dextrose as carbon source

NRRL 3080 and 3090—14 days.—With copper sulfate (unmodified original formula): Growth good at this date. Isolated colonies 4 mm. flattened with 2–3 mm. convex center. Edges entire to slightly erose. Sporulation good on isolated colonies, moderate to poor in center of confluent growth streak. No diffusible pigment. Some colonies growth.

Sporulating aerial between 3ge, 79, light grayish yellowish brown and 3ig, 80, grayish yellowish brown. Reverse center of confluent growth 2gc grayish yellow, edge of growth streak and center of isolated colonies 21g, 94, light olive brown.

Modified-copper sulfate omitted

Growth similar but better than with copper. Isolated colonies 6.0 mm. Sporulating aerial 3ig, 80, grayish yellowish brown. Reverse, same as with copper.

Carbon source sodium acetate—14 days

Modified basal medium without added copper.

NRRL 3089.—Isolated colonies 6.0 mm. flattened, edges filamentous, well sporulated. No diffusible pigment. Sporulated aerial 3fe, 63, light brownish gray. Reverse 1½ge, 109, light grayish olive.

NRRL 3090.—Growth similar to NRRL 3089. Aerial color identical. Reverse 1½ec, 93, yellowish gray.

Nutrient gelatin

NRRL 3089 and 3090.—Slight surface growth slight liquefaction at 3 days increasing upon incubation to 10.0 mm. liquefaction at 14 days. No diffusible pigment. Surface pellicle and aerial at 7 and 14 days.

Nitrate Reduction

NRRL 3089 and 3090.—Nitrate positive at 3 days and 14 days from nutrient nitrate broth, nutrient nitrate and synthetic nitrate agar slants. No diffusible pigment was noted.

Litmus milk

NRRL 3089 and 3090.—Complete peptonization by fourteen days without prior coagulation. Heavy surface ring and pellicle. Final pH day 14 (electrometric), 7.8.

Peptone iron agar slants

NRRL 3089 and 3090.—$H_2S$ positive by lead acetate test at three days, very slight browning of medium at 14 days, no pigment at 21 days. Melanin negative.

Loeffler's serum slants

NRRL 3089 and 3090.—Abundant growth, no liquefaction of medium by day 21.

(II) UTILIZATION OF CARBON SOURCES—BASAL MEDIUM OF PRIDHAM AND GOTTLIEB, J. BACT. 56:107, 1948

Test for utilization of carbon sources was carried out in the basal medium and a modification in which $CuSO_4$ was deleted from the formula. Distilled water was used in the media. Both strains gave identical responses to the carbon sources in each case. Growth was delayed in the presence of CuSO₄ with all substrates which were utilized.

Carbon sources utilized readily: xylose, arabinose, rhamnose, dextrose, galactose, mannose, fructose, sucrose, lactose, maltose, cellobiose, soluble starch, salicin, glycerol, and mannitol. Inositol was utilized well but more slowly. Sodium acetate was utilized only in the modified medium. Not utilized were: sorbose, raffinose, dulcitol, sorbitol, sodium citrate, and sodium potassium tartrate.

(III) MICROMORPHOLOGY

The aerial and substratal mycelia branch monopodially. The mycelium is non-septate. Subterminal sporophores arise monopodially but occasionally in pairs. In fully formed or well developed fruiting aerial, the terminal spore chains are fasciculate. Subterminal spore chains at close intervals either directly or secondarily from the mycelial filament, the whole giving the appearance of a disordered cluster. Sport chains are of medium length containing 15–25 ovoid spores. Open sinistrorse spirals of three to five turns predominate, but the same cluster may contain chains that are merely flexuous or hooked or with loose terminal coils of one and a half to two turns. These characteristics agree well with morphological type (A) subsection (a) of Nomi, R., J. Antibiotics Ser. A, XIII–4, 236, July 1960.

Electron microscopy.—Spores are covered with sharp, slightly recurved spines which are approximately half to three quarters the short diameter of the spore. Exclusive of spines, the average spore size is approximately $0.9–1.0\mu$ by $0.1–0.8\mu$. Terminal spores in a chain are spherical.

Fermentation of *Streptomyces impexus* is carried out in submerged form at a controlled temperature with suitable agitation and aeration in an aqueous medium containing suitable sources of carbon and nitrogen together with inorganic salts. The exact nutritional requirements for the production of the desired antibiotic have not been determined, but when a complex nutrient such as corn steep liquor or soybean meal is used, it is not necessary to add specific trace elements. The rate of aeration and agitation is dependent on the design of the fermentation tanks and those experienced in the art will recognize that the particular rates given in the examples would be subject to change in larger equipment. The rates are not critical, however, in the equipment used in the examples. The organism, *Streptomyces impexus* is able to produce satisfactory amounts of the desired antibiotic over a temperature range of at least 24°–32° C.

The presence of antimicrobial substances in the fermentation broth is easily demonstrated by the usual methods of antibacterial assay such as the agar dilution assay, a description of which follows:

Material for assay is diluted in two-fold increments directly in sterile agar medium of the following composition: tryptone 3.0 grams, beef extract 3.0 grams, glucose (technical) 1.0 gram, yeast extract 1.0 gram, KH₂PO₄ 1.0 gram, K₂PO₄ 3.0 grams, agar 20.0 grams, and deionized water 1.0 liter. The surface of the gelled medium is inoculated with a drop of an overnight broth culture of *Staphylococcus aureus* 209P which has been diluted 1:10 in sterile water. After 16–18 hours incubation at 32° C., the potency of an unknown material is read as reciprocal of the final dilution of the material just preventing growth of the test organism. Thus a material diluted in the agar medium at two-fold increments final concentration of 1:10, 1:20 up to 1:1280 may prevent growth of the test organism at a dilution of 1:320 but not at 1:640. The antibiotic potency of the material is then expressed as 320 agar dilution units. If it allowed only very slight growth at 1:640, the potency would be estimated as 480 agar dilution units.

The subject of this invention is only one of several antibacterial substances in the broth and so a direct assay of the broth will probably be misleading, particularly since the greater part of the antibiotic of interest is usually found in the solid phase of the fermented culture. Better evidence for the presence of the desired antibiotic is provided by centrifuging a sample of the whole broth at pH 2–5, discarding the clear supernatant which contains most of the interfering antibacterial substances, and shaking the solids, which contain most of the desired antibiotic, with methanol. Standard methods of antibacterial assay, when applied to the methanol solution thus obtained, give a fairly reliable indication of the fermentation yield. In addition to antibacterial substances that interfere with the assay, there are impurities of an undetermined nature which alter the water solubility and the diffusion rate of the antibiotic in agar. More accurate assays are possible after some of these substances have been removed by further purification. The assay used for most of the quantitative work in the later stages of purification follows.

The agar diffusion zone assay is an adaptation of conventional methods used for assaying other antibiotics. Standard filter paper discs are used to apply the reference standard and unknown solutions to the agar surface. Other methods such as cups or multiwell steel plates may be used to apply the solutions in a confined area.

The test organism is *Sarcina lutea* ATCC 9341. The agar medium used for the assay is Difco tryptose phosphate broth to which 20.0 grams per liter of agar is added.

The broth culture of *Sarcina lutea* is adjusted to 20% light transmission with sterile water using a Lumetron colorimeter with a 650 m$\mu$ filter. The adjusted suspension is used at 5.0% v./v. as the final concentration of the test organism in the assay medium.

A solution of the reference standard is made in methanol to four times the concentration required for the highest concentration used for the standard curve. Further dilutions are made in a solution of equal parts of 1.0% potassium phosphate buffer pH 6.3 and dimethylformamide. The addition of dimethylformamide is made just prior to use. Materials for assay are diluted to appropriate theoretical concentrations in the same diluent and plated on the agar surface by conventional techniques alternately with an appropriate solution of the reference standard.

One unit of activity for the agar zone assay is defined as equivalent to two agar dilution units. Appropriate concentrations of the reference standard are used to determine the standard curve wherein the average diameter of zones of growth inhibition are plotted on semilogarithmic paper against the log of the concentration in units of activity. The sensitivity of the assay is about ten units. Therefore, the reference standard curve is determined from concentrations, for example, of 200, 100, 50, 25, and 12.5 u./ml. The dimethylformamide, necessary to enhance the sensitivity of the assay by about four-fold, produces a small diffuse zone of inhibition which prevents attributing zones of inhibition to the antibiotic at levels below an extension of the standard curve to about five theoretical units. The potency of the unknown solution is estimated by referring the diameter of its zone of inhibition to the standard curve.

The antibiotic produced during the fermentation is recovered by filtering the beer and extracting the solids with a solvent such as acetone or a lower alcohol. Further purification can be achieved in a variety of ways. It should be noted that while the crude antibiotic is soluble in acetone, when in the presence of water, the relatively pure antibiotic is insoluble therein, acetone can therefore be used to dissolve the crude solid and also to precipitate the relatively pure antibiotic. Some impurities are adsorbed on activated carbon from an aqueous acetone solution of the antibiotic. Additional impurities can be removed by treatment of solutions of the antibiotic with ion exchange materials. A particularly useful purification step is the treatment of a solution of the antibiotic in methanol with Reinecke salt (ammonium tetrathiocyanodiammonochromate), a reagent commonly employed to form insoluble salts with organic bases. In this case a precipitate of undetermined nature is formed and the antibiotic, when recovered from the solution, is found to be appreciably more soluble in water than before the treatment with Reinecke salt.

Material purified by the latter technique is not homogeneous in the chemical sense, but it is pure enough and potent enough to be useful in curing experimental infections in mice caused by sensitive bacteria such as *Streotococcus pyogenes*, *Diplococcus pneumoniae* and *Staphylococcus aureus*.

The following examples illustrate the production, isolation, and purification of Antibiotic M–411.

EXAMPLE 1

To a 500 ml. Erlenmeyer flask is added 150 ml. of the following nutrient medium:

| | Grams per liter |
|---|---|
| Glucose monohydrate | 15 |
| Defatted soybean flour | 15 |
| Sodium chloride | 5 |
| Calcium carbonate | 1 |

The flask and its contents are sterilized by autoclaving for a period of 25 to 30 minutes at a temperature of 121° C. After cooling, the flask is inoculated with a section from the surface of an agar slant on which *Streptomyces impexus* strain NRRL 3089 has been growing for at least 4 days. The inoculated flask is swirled at 28° C. on a rotary shaker having a stroke of 2.25 inches and operating at about 240 r.p.m. for a period of about 48 hours. Additional flasks prepared and sterilized as above are each inoculated with about 3 ml. of the 48-hour culture, and swirled as described above for a period of 48 hours.

In a stainless steel fermentation tank of 23 liters capacity, is placed 12 liters of a nutrient medium having the following composition:

| | Grams per liter |
|---|---|
| Glucose monohydrate | 10 |
| Defatted soybean flour | 10 |
| Sodium chloride | 5 |
| Calcium carbonate | 1 |
| Polypropylene glycol antifoam | 1 |

The fermentor and its contents are sterilized by autoclaving for 90 minutes at 121° C. After cooling, the fermentor is inoculated aseptically with the contents of three flasks of the above described second passage seed culture. The culture is grown in the fermentor at 28° C. for 6 days during which time sterile air is passed into the bottom of the tank at the rate of about 10 liters per minute and the contents of the fermentor are mechanically stirred by a 4-bladed impellor of approximately 20 cm. diameter operated at about 360 revolutions per minute.

After the culture has been grown as described above for 6 days, the broth (8 liters) is mixed with a filter aid and filtered. The wet filter cake is mixed with enough acetone to bring its volume to 8 liters and stirred to dissolve the antibiotic. The slurry is filtered and the filtrate is concentrated to a volume of 200 ml. by distillation at reduced pressure. The aqueous concentrated solution is extracted with chloroform to remove impurities including at least one lipophilic antibiotic. The water phase is separated from the chloroform and evaporated to dryness. The dry residue is dissolved in a small amount of methanol which is filtered and then mixed with acetone to precipitate the crude antibiotic in a yield of 300 mg.

The crude antibiotic at a concentration of 64 micrograms/ml. prevents the growth of *Staphylococcus aureus* in broth for a period of at least 48 hours. When mice are infected intraperitoneally with a suspension of *Staphylococcus aureus* Smith, and then treated with a total dose of 600 mg./kg. of the crude antibiotic in water suspension administered intramuscularly in four equal doses spaced over a six-hour period, all of the treated mice survive for a period of at least 10 days, while all of the mice so infected and not treated die within 24 hours.

EXAMPLE 2

A flask of nutrient broth prepared and sterilized as in Example 1 is inoculated with *Streptomyces impexus* NRRL 3090 taken from an agar slant at least 4 days old. The inoculated flask is incubated and subcultured as in Example 1 to prepare second passage seed.

A nutrient medium is prepared by adding to water the following ingredients:

| | Grams per liter |
|---|---|
| Corn steep liquor (wet weight) | 20 |
| Dextrin | 10 |
| Soybean meal | 10 |
| Sodium chloride | 5 |
| Dipotassium hydrogen phosphate | 2 |
| Calcium carbonate | 2 |
| Polypropylene glycol antifoam | 1 |

The pH is adjusted to 6.8–7.0 by addition of sodium carbonate and the medium is dispensed into stainless steel fermentation tanks of 14 liter capacity, 6 liters in each tank. The tanks and their contents are sterilized by autoclaving for 60 minutes at 121° C. After cooling, each tank is inoculated with 150 ml. of the above second passage seed culture. The fermentors are stirred at 28° C. for 5 days, during which time sterile air is forced into the bottom of each tank at the rate of 6 liters per minute. After 5 days, the contents of 24 such tanks are pooled to give about 130 liters of fermented broth which is adjusted to pH 5.5 with hydrochloric acid, mixed with a diatomaceous silica filter aid, such as Hyflo Supercel, a product of the Johns-Manville Company, and filtered with suction. The liquid phase is discarded as it contains little of the desired antibiotic. The filter cake is stirred for one hour with 20 liters of acetone. Activated carbon 200 grams, is added, and the mixture is stirred for another 30 minutes and filtered. The filter cake is washed with 2 liters of acetone. The combined filtrate and wash is concentrated under vacuum to remove the acetone leaving the antibiotic as a solid suspended in 900 ml. of water. The solid is collected by centrifugation, dissolved in 200 ml. of methanol, filtered, and stirred during addition of one liter of acetone to precipitate the antibiotic. The precipitate is collected by centrifugation, dissolved in 150 ml. of methanol and passed through a column of 16 mm. diameter containing 100 ml. of a trimethylbenzylammonium polystyrene resin in the chloride for (such as Dowex 1X2, a product of the Dow Chemical Company, Midland, Mich.). The column is washed with 500 ml. of methanol. The effluent and wash are combined and concentrated to 30 ml. Ammonium tetrathiocyanodiammonochromate (0.57 g.) is added and the solution is stirred for 30 minutes. An inactive precipitate forms and is removed by centrifugation, washed with 10 ml. of methanol, and discarded. The supernatant and washings are combined and stirred while 200 ml. of acetone is slowly added to precipitate the antibiotic. The precipitate is collected by centrifugation, washed with several small portions of acetone, dissolved in 25 ml. of water and freeze dried to yield 300 mg. of solids assaying 1375 units/mg. by the agar diffusion assay.

The antibiotic prepared by this process is a white powder soluble in methanol, fairly soluble in ethanol, and less soluble in higher alcohols. It is virtually insoluble in other common organic solvents such as chloroform, diethyl ether, ethyl acetate and acetone. The solubility in water is of the order of 5% or slightly greater. The dry powder is stable for at least one year at room temperature. In water solution, the stability depends on the pH and the temperature so that water solutions may be stored at 4° C. without loss of potency for at least 6 weeks at a pH between 2 and 10. At 40° C., the antibiotic is stable for several weeks at pH 2 and 4, and increasingly unstable at higher pH values. The approximate times for 50% loss of activity at 40° C. are three weeks at pH 6, one week at pH 8, and one day at pH 10. At pH 2, the antibiotic is stable for one hour at 100° C.

The elemental analysis of antibiotic compound prepared in accordance with the method illustrated in the examples is as follows: 43.01% C; 6.2% H; 13.28% N; 25.89% O; 10.24% Cl; and 1.4% Na. The antibiotic has a high molecular weight which is difficult to determine and which is different in water than in organic solvents.

The infrared absorption spectrum of the antibiotic suspended in Nujol mull (a mineral oil from petroleum, commonly used for this purpose) is reproduced in the accompanying drawing and is summarized in the following table. Antibiotic M-411 shows peaks at the indicated wave lengths expressed in reciprocal centimeters. Band intensities are indicated as strong, medium, or weak, with the estimates being made on the basis of a percentage absorbence scale.

Tabulation of infrared absorption bands antibiotic run in solid state as Nujol Mull

| Wave length in microns | Frequency in reciprocal centimeters | Relative intensity |
|---|---|---|
| 3.05 M | 3,280 cm.$^{-1}$ | Strong (broad). |
| 3.40 | 2,941 | Nujol. |
| 6.06 | 1,650 | Strong. |
| 6.56 | 1,524 | Do. |
| 6.80 | 1,471 | Nujol. |
| 7.23 | 1,383 | Do. |
| 7.90-8.15 | 1,266-1,227 | Medium (broad). |
| 8.50 | 1,176 | Weak. |
| 11.85 | 843 | Do. |
| 13.85 | 722 | Nujol. |

Antibiotic M-411 inhibits the growth of a wide variety of common gram-positive bacteria in vitro. Against the common gram-negative bacteria and against fungi, there is little or no effect. The following table illustrates the antibiotic activity of M-411 prepared as in Example 2.

| Organism: | Minimum inhibitory concentration, mcg./ml. |
|---|---|
| Staphylococcus aureus | .26 |
| Staphylococcus epidermidis | .52 |
| Streptococcus pyogenes | .03 |
| Streptococcus faecalis | 2.1 |
| Diplococcus pneumoniae | 1.0 |
| Clostridium perfringens | 0.13 |
| Neisseria catarrhalis | 1.0 |
| Bacillus subtilis | .26 |
| Escherichia coli | >100 |
| Proteus vulgaris | >100 |
| Pseudomonas aeruginosa | >100 |

What is claimed is:

1. An antibiotic effective against gram-positive bacteria which has a solubility in water of about 5% is soluble in methanol, fairly soluble in ethanol, less soluble in higher alcohols, and is virtually insoluble in other organic solvents, has the following elemental analysis: 43.01% C, 6.2% H, 13.28% N, 25.89% O, 10.24% Cl, and 1.4% Na; and has an infrared absorption spectrum when suspended in a mineral oil mull as follows:

Tabulation of infrared absorption bands antibiotic run in solid state as Nujol Mull

| Wave length in microns | Frequency in reciprocal centimeters | Relative intensity |
|---|---|---|
| 3.05 M | 3,280 cm.$^{-1}$ | Strong (broad). |
| 3.40 | 2,941 | Nujol. |
| 6.06 | 1,650 | Strong. |
| 6.56 | 1,524 | Do. |
| 6.80 | 1,471 | Nujol. |
| 7.23 | 1,383 | Do. |
| 7.90-8.15 | 1,266-1,227 | Medium (broad). |
| 8.50 | 1,176 | Weak. |
| 11.85 | 843 | Do. |
| 13.85 | 722 | Nujol. |

2. A process for the production of an antibiotic as defined in claim 1 and effective against gram-positive bacteria which comprises cultivating an organism selected from the group consisting of *Streptomyces impexus* NRRL 3089 and NRRL 3090 under submerged aerobic conditions in a culture medium containing assimilable sources of carbohydrates, organic nitrogen, and inorganic salts until substantial antibiotic activity is produced by said organism, and recovering the antibiotic from said culture medium.

3. A process as claimed in claim 2 in which the organism employed is *Streptomyces impexus* NRRL 3089.

4. A process as claimed in claim 2 in which the organism employed is *Streptomyces impexus* NRRL 3090.

5. A process as claimed in claim 2 in which the culture medium is maintained at a temperature of from 24°–32° C. for a period of from 2–6 days.

6. A process as claimed in claim 2 which includes the steps of filtering the culture medium and extracting the antibiotic from the solid produced with a solvent selected from the class consisting of acetone and lower alkanol.

7. A process as claimed in claim 6 in which the solvent is acetone.

8. A process as claimed in claim 6 in which the solvent is methanol.

References Cited

UNITED STATES PATENTS 3,536,811  10/1970  Ottens et al.  424—716

JEROME D. GOLDBERG, Primary Examiner

U.S. Cl. X.R.

195—80